United States Patent Office 2,846,969
Patented Aug. 12, 1958

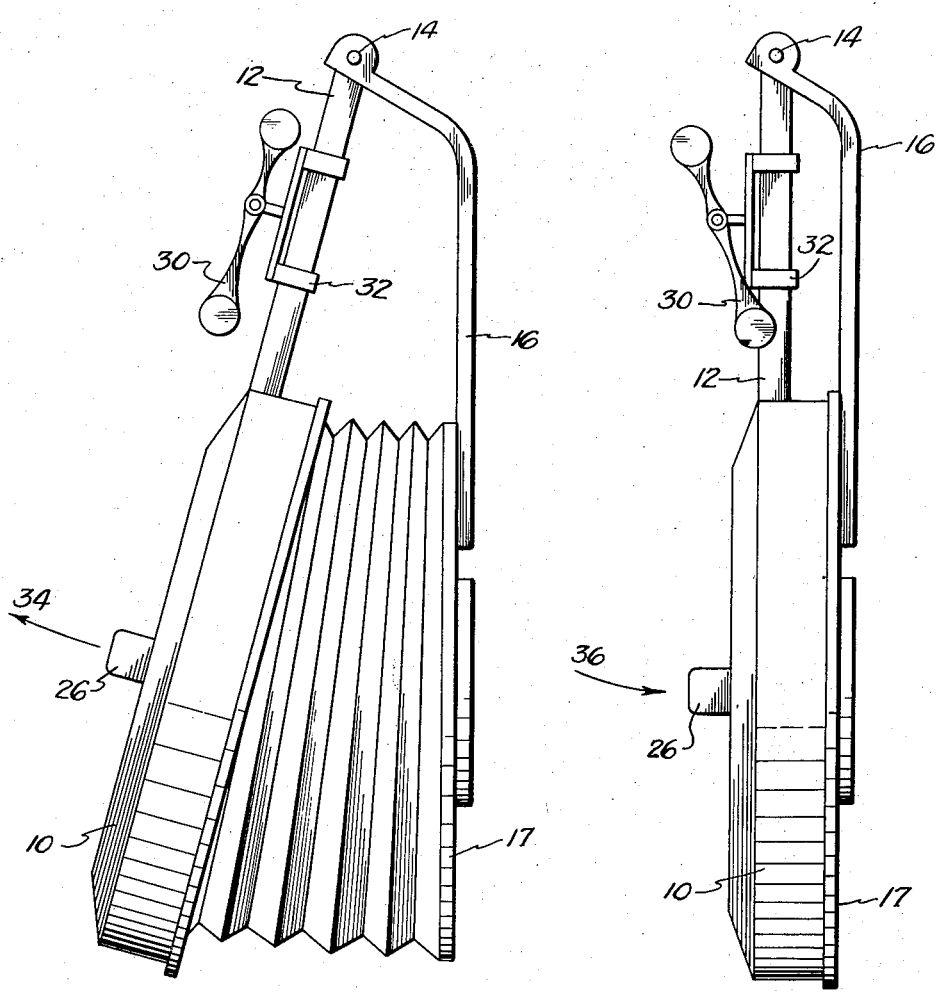

2,846,969

BELLOWS FOR VENTILATING SHELTERS

Karl-August Wächter, Lubeck-Brandenbaum, Germany, assignor to Otto Heinrich Drager, Lubeck, Germany Application March 26, 1956, Serial No. 573,954

Claims priority, application Germany April 18, 1955

4 Claims. (Cl. 116—114)

This invention relates to an air bellows for ventilating shelters, such as underground air raid shelters.

In the use of such bellows for drawing ventilating air into a shelter, the number of strokes per unit of time must be determined in order to maintain the required quantity of fresh air in the shelter. A duration of time is selected, and the number of bellows strokes for that time then accordingly set. Watches or metronomes are used, but these devices are expensive and not entirely reliable.

It has also been suggested to control the number of strokes of an air bellows by means of a freely swinging pendulum. However, such pendulums have not been connected to the bellows in order to receive motion therefrom. This has the disadvantage in that the pendulum must be independently kept in constant motion as long as it is relied upon as a control device.

The object of the instant invention is to connect the pendulum to an air bellows so that the rate of operation of the bellows can be matched against the oscillation of the pendulum.

In general, the object is obtained by a simple device. A pendulum is connected to an oscillating member of the air bellows with a point of suspension such that the movement of the bellows is transmitted to the pendulum. The pendulum oscillates regularly only when its period of inherent oscillation is identical with the stroke rate of the bellows. This is a simple device for observing and determining the number of bellows strokes. By being moved by the bellows, the pendulum is constantly kept in motion.

In a simple embodiment of the invention, the bellows is fastened to the arm supporting the swinging portion of the bellows. The pendulum can be mounted in a hole in the arm and journaled in a roller bearing, prismatic bearing, or conical bearing.

The pendulum is selected so that its oscillation is the same as the pre-selected number of bellows strokes. For example, when the bellows should operate at the rate of 40 strokes per minute, a pendulum is used whose oscillation is about 1.5 seconds. As the bellows is operated, it is then only necessary to watch the pendulum and to see that it oscillates evenly. If the pendulum does not swing naturally and in synchronism with the movement of the bellows, it is apparent that the bellows is not being operated at the pre-selected rate. The oscillation of the bellows, of course, depends upon its length.

The means by which the objects of the invention are obtained are described more fully with reference to the accompanying drawings, in which:

Figure 3 is a side elevational view of a modified form of the invention with the bellows extended; and Figure 4 is a side elevational view of the modification of Figure 3 with the bellows collapsed.

Figures 1, 2:
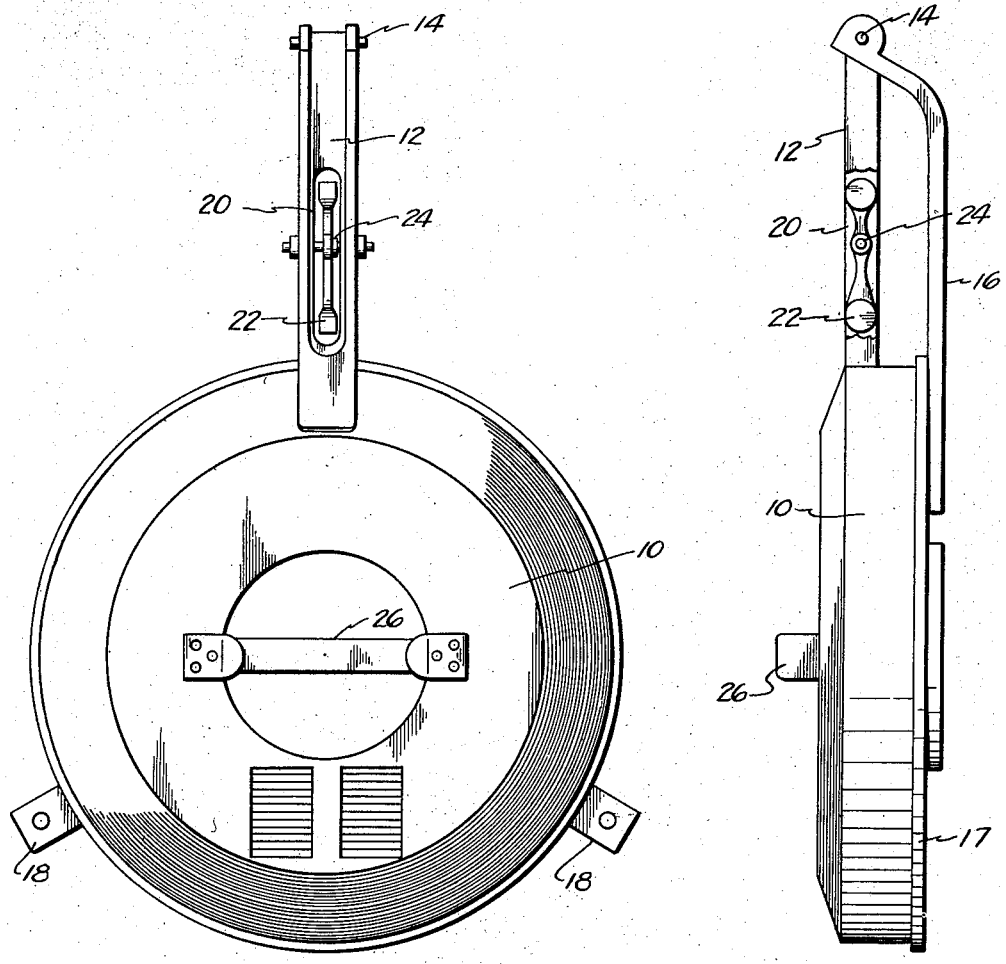
Figure 1 is a front elevational view of the bellows with a pendulum mounted thereon.
Figure 2 is a side elevational view of Figure 1.

In Figures 1 and 2, the bellows 10 is suspended from a swinging arm 12 which is supported from hinge 14 to a bracket 16 adapted to be fastened to the wall of a shelter. Stationary portion 17 of the bellows is also secured to the wall as by means of brackets 18.

An elongated hole 20 is formed in arm 12. A pendulum 22 is mounted in this hole upon an axle 24 which is journaled in a roller, prismatic, or conical bearing. Bellows 12 can be manually operated by a handle 26. Pendulum 22 has been selected to oscillate at the rate at which the bellows should be operated. As the bellows opens and closes, the swinging movement of arm 12 is transmitted to pendulum 22; and if the pendulum does not oscillate evenly, it is at once shown that the bellows is not being operated at the proper rate, and its movement accordingly adjusted to bring it into synchronism with the pendulum.

In Figures 3 and 4, the pendulum 30 is mounted upon arm 12 by means of a bracket 32, and thus extends outside of arm 12. The bellows is extended in Figure 3 having been moved in the direction of the arrow 34 and pendulum 30 is swung into the position shown. When the bellows is collapsed, having been moved in the direction of arrow 36 in Figure 4, pendulum 30 swings to the position shown. This sequence of motion is repeated in successive bellows strokes, and the pendulum oscillates in accordance with the bellows movement.

Having now described the means by which the objects of the invention are obtained,

I claim:

1. In combination with a ventilating device having an oscillating member, the improvement comprising a pendulum independently swingably mounted upon said member with said pendulum having a natural oscillation selected to be at the rate the member is to be oscillated.

2. In the combination of claim 1, said device comprising a bellows.

3. In the combination of claim 2, said member comprising an arm from which said bellows is suspended.

4. In the combination of claim 3, further comprising a hole in said arm with said pendulum mounted in said arm.

References Cited in the file of this patent

UNITED STATES PATENTS

| | | |
|---|---|---|
| 1,129,095 | Huw | Feb. 23, 1915 |
| 1,460,218 | Smith | June 26, 1923 |